(12) United States Patent
Deboyser et al.

(10) Patent No.: US 12,321,501 B2
(45) Date of Patent: Jun. 3, 2025

(54) METHOD FOR SECURELY PROVISIONING AN INTEGRATED CIRCUIT

(71) Applicant: NXP B.V., Eindhoven (NL)

(72) Inventors: Fabien Jacques Deboyser, Gratentour (FR); Marc Vauclair, Overijse (BE)

(73) Assignee: NXP B.V., Eindhoven (NL)

( * ) Notice: Subject to any disclaimer, the term of this patent is extended or adjusted under 35 U.S.C. 154(b) by 351 days.

(21) Appl. No.: 18/177,416

(22) Filed: Mar. 2, 2023

(65) Prior Publication Data

US 2023/0289480 A1 Sep. 14, 2023

(30) Foreign Application Priority Data

Mar. 14, 2022 (EP) .................................... 22305290

(51) Int. Cl.
 *G06F 15/16* (2006.01)
 *G06F 21/72* (2013.01)
 *H04L 9/14* (2006.01)

(52) U.S. Cl.
 CPC ................ *G06F 21/72* (2013.01); *H04L 9/14* (2013.01)

(58) Field of Classification Search
 CPC .................................... G06F 21/72; H04L 9/14
 See application file for complete search history.

(56) References Cited

U.S. PATENT DOCUMENTS

| | | | |
|---|---|---|---|
| 7,340,057 B2 | 3/2008 | Martin, Jr. et al. | |
| 8,302,165 B2 | 10/2012 | Bhai et al. | |
| 9,756,505 B1 | 9/2017 | Jiang et al. | |
| 9,762,392 B2 | 9/2017 | Carrer et al. | |
| 9,866,392 B1 | 1/2018 | Campagna et al. | |
| 10,505,732 B2 * | 12/2019 | Doliwa | H04L 9/3066 |
| 10,762,311 B2 * | 9/2020 | Lemsitzer | H04L 9/3239 |
| 2019/0042708 A1 | 2/2019 | Pala et al. | |

(Continued)

FOREIGN PATENT DOCUMENTS

EP 3444999 B1 1/2020

OTHER PUBLICATIONS

Bignalet, Xavier et al.; "Implementing Secure Authentication with AWS IoT and Microchip's Trust Platform"; AWS Partner Network (APN) Blog in AWS Network, Intermediate (200) Internet of Things, Security; Oct. 25, 2019.

(Continued)

*Primary Examiner* — Normin Abedin (57) ABSTRACT

A method is provided for securely provisioning a plurality of integrated circuits (ICs) manufactured by a first entity for use in a plurality of manufactured product types manufactured by a second entity. Each IC of the plurality of ICs includes a key pair and a unique identifier (UID). The first entity generates a plurality of key pairs that are not related to the plurality of ICs. A plurality of product types is received from the second entity. A plurality of certificates is generated by the first entity using the UIDs and the key pairs. The plurality of certificates is transferred from a first computer system of the first entity to a second computer system under physical control of the second entity. The second entity injects the plurality of ICs with selected certificates of the plurality of certificates. Unused certificates may be deleted from the second computer system.

21 Claims, 7 Drawing Sheets

(56) References Cited

U.S. PATENT DOCUMENTS

2019/0052464 A1* 2/2019 Doliwa ................ H04L 9/0841

OTHER PUBLICATIONS

NXP EdgeLock 2GO "Delivering Trusted IoT Connections with the EdgeLock 2GO Platform" Jan. 2021.

Wood, Rob; "Secure Device Provisioning Best Practices: Heavy Truck Edition"; NCC Group, Sponsored by and drafted in collaboration with National Motor Freight Traffic Association, Inc and heavy vehicle industry partners; 2019.

* cited by examiner

FIG. 7

METHOD FOR SECURELY PROVISIONING AN INTEGRATED CIRCUIT

CROSS-REFERENCE TO RELATED APPLICATIONS

This application claims priority under 35 U.S.C. § 119 to European Patent Application No. 22305290.3, filed on Mar. 14, 2022, the contents of which are incorporated by reference herein.

BACKGROUND

Field

This disclosure relates generally to electronic circuits and more specifically to a method for securely provisioning an electronic device incorporating an integrated circuit (IC).

Related Art

Trust provisioning is a process in which secret assets, such as a key pair including a private key and a public key, are generated and installed on a device for the first time after its production. The private key may be used to sign a message with a nonce during an attestation phase. Typically, a device attestation certificate is used to certify the public key. Generally, the device attestation certificate includes a vendor identification (ID) and a product ID. This implies that an IC manufacturer may not be able to provision a device in advance during manufacturing because the destination product ID may not be known yet, which may create delays in product delivery to the customer. Some ICs are configurable to be used in multiple different products, and it may not be known the product types in which the ICs will land, or the credentials needed in an operational phase of the ICs. Also, there may not be enough storage space in the ICs to store all the possible product types.

Therefore, a need exists for a way to provision a plurality of ICs that solves at least some of the above problems.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Generally, there is provided, a method for provisioning a plurality of ICs. In one embodiment, the method is useful for an original equipment manufacturer (OEM) that produces more than one product type with the same IC or set of ICs. During manufacturing of a plurality of ICs, an IC manufacturer (ICM) provisions each IC of the plurality of ICs with a key pair and a unique identifier (UID). At least a part of the key pair may be part of the UID, such as for example, the public key part. The plurality of ICs is for use in a plurality of products produced by the OEM and comprising a plurality of product types. However, at the time of manufacture of the ICs by the ICM, the product types are unknown. As an initial step of the method, the plurality of ICs is provided to the OEM by the ICM without being fully provisioned. As a subsequent step of the method, the ICM generates a plurality of key pairs that are not related to the plurality of ICs. When the product types are known by the OEM, the OEM provides a plurality of product types to the ICM that the ICs are intended to be used in. The ICM then associates the plurality of key pairs with the product types, one key pair per product type. The ICM generates a plurality of certificates using the UIDs and the plurality of key pairs. The plurality of certificates is then communicated to the OEM. To communicate the plurality of certificates securely, the plurality of certificates is transmitted from a first computer system of the ICM to a second computer system under physical control of the OEM. The second computer system is trusted by both the ICM and the OEM. The OEM is enabled by the ICM to access the plurality of certificates in the second computer system and inject the certificates into the plurality of ICs. Any unused certificates are deleted.

The method provides a secure approach to provision a plurality of generic ICs for use in multiple product types. The method allows delivery of the ICs to the OEM when knowledge of the product types is delayed. The method facilitates product handling by the OEM for provisioning on the OEM's premises and reduces or eliminates a need for a direct connection to a hardware security module (HSM). Also, the method provides for more efficient use of memory by deleting any unused certificates. In addition, the OEM does not have access to the private keys assigned to product types, thus reducing a required security level of the second computer system compared to a security level of the first computer system.

In accordance with an embodiment, there is provided, a method for provisioning a plurality of integrated circuits (ICs), the method including: providing, by a first entity to a second entity, the plurality of ICs for use in a plurality of manufactured products, wherein each IC of the plurality of ICs includes a key pair and a unique identifier (UID); generating, by the first entity, a plurality of key pairs, wherein the plurality of key pairs is not related to the plurality of ICs; receiving, by the first entity, a plurality of product types from the second entity; generating, by the first entity, a plurality of certificates using the plurality of UIDs and the plurality of key pairs, and wherein portions of the plurality of key pairs are associated with the plurality of product types; and transmitting the plurality of certificates from a first computer system of the first entity to a second computer system, the second computer system under physical control of the second entity, wherein the second entity is enabled by the first entity to access the plurality of certificates in the second computer system and to inject at least a portion of the plurality of ICs with selected certificates of the plurality of certificates. This method provides a solution to the problem of how to provide a secure approach to provision a plurality of generic ICs for use in multiple product types. Receiving a plurality of product types from the second entity may further include receiving a certificate signing request (CSR) corresponding to a product type of the plurality of product types, and wherein the first entity uses a key pair of the plurality of key pairs associated with a certificate to sign the CSR. The method may further include, prior to the second entity injecting at least a portion of the plurality of manufactured products with the selected certificates, the second computer system favorably comparing a key pair corresponding to a selected certificate as generated by the first entity to a key pair corresponding to the selected certificate as possessed by the second entity. All the plurality of certificates for all the plurality of product types may be pre-computed by the first entity and transmitted to the second computer system from the first computer system in response to receiving the plurality of product types from the second entity. A key pair of the plurality of key pairs may include a private key and a public key, wherein a public key is transmitted with each certificate of the plurality of certificates transmitted to the second entity. The product type may include a vendor identification and a product identification. The second computer system under physical control of the second entity may be trusted by the first entity. The first entity may be a manufacturer of the plurality of ICs, and the second entity may be a trusted manufacturer of the plurality of manufactured products. The method may further include deleting unused certificates of the plurality of certificates from the second computer system. An asymmetric cryptographic mechanism may be used to create the plurality of certificates.

In another embodiment, there is provided, a method for provisioning a plurality of integrated circuits (ICs), the method including: providing, by a first entity to a second entity, the plurality of ICs being of a same type and for use in a plurality of manufactured products, wherein each IC of the plurality of ICs includes one key pair of a plurality of first key pairs and a unique identifier (UID) of a plurality of UIDs; generating, by the first entity, a plurality of second key pairs, wherein the plurality of second key pairs is not related to the plurality of ICs; receiving, by the first entity, a plurality of product types from the second entity; generating, by the first entity, a plurality of certificates using the plurality of UIDs and the plurality of product types; transmitting the plurality of certificates from a first computer system of the first entity to a second computer system, the second computer system under physical control of the second entity, wherein the second entity is enabled by the first entity to access the plurality of certificates in the second computer system and to provision at least a portion of the plurality of ICs with selected certificates of the plurality of certificates; and deleting unused certificates of the plurality of certificates from the second computer system. This method provides an alternative solution to the problem of how to provide a secure approach to provision a plurality of generic ICs for use in multiple product types. The method may further include, prior to the second entity provisioning at least a portion of the plurality of manufactured products with the selected certificates, the second computer system favorably comparing a key pair corresponding to a selected certificate as generated by the first entity to a key pair corresponding to the selected certificate as possessed by the second entity. All the plurality of certificates for all the plurality of product types may be pre-computed by the first entity and transmitted to the second computer from the first computer system in response to receiving the plurality of product types from the second entity. A key pair of the plurality of key pairs may include a private key and a public key, wherein a public key may be transmitted with each certificate of the plurality of certificates transmitted to the second entity. The product type may include a vendor identification and a product identification. The second computer system under physical control of the second entity may be trusted by the first entity. The first entity may be a manufacturer of the plurality of ICs, and the second entity may be a trusted manufacturer of the plurality of manufactured products. The plurality of ICs may be all the same generic IC type that is intended to be used in the plurality of product types. An asymmetric cryptographic mechanism may be used to create the plurality of certificates. The second computer system may assess a genuineness of each IC of the plurality of ICs prior to provisioning of the at least a portion of the plurality of ICs. The method may further include receiving a certificate signing request (CSR) corresponding to a product type of the plurality of product types, wherein the first entity uses a key pair of the plurality of second key pairs associated with the certificate to sign the CSR.

Figure 1:
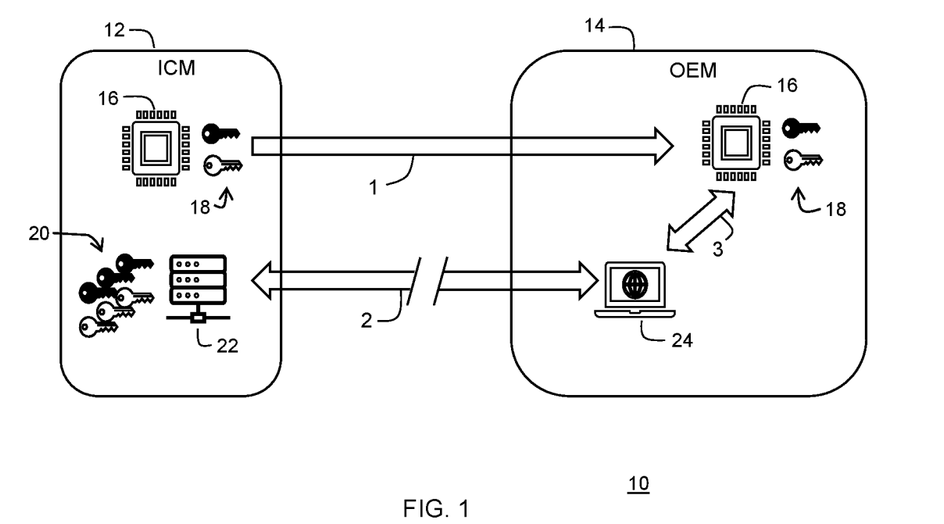
FIG. 1 illustrates an overview of a method for provisioning a device in accordance with an embodiment.

FIG. 1 illustrates an overview of method 10 for provisioning a device in accordance with an embodiment. FIG. 1 depicts an ICM environment 12 and an OEM environment 14. Shown in ICM environment 12 is an IC 16 and a corresponding key pair 18, a plurality of key pairs 20, and a computer system 22. In one embodiment, computer system 22 may be, for example, a secure server or a hardware security module (HSM). OEM environment 14 shows IC 16 and key pair 18 after IC 16 and key pair 18 are provided to OEM environment 14. A different key pair 18 is generated for each IC 16. A different key pair 20 is associated with each product type that IC 16 can be used in. Note that the key pairs 20 does not correspond with the ICs, only the product types. Also, OEM environment 14 includes a computer system 24 for communicating with computer system 22. The OEM may be a customer of the ICM. A first phase of trust provisioning is done during a manufacturing process of IC 16 where a (cryptographic) device identity and key pair 18 are created. A key pair, such as in key pairs 18 and 20, includes a private key and a public key. In the drawings, the private key is dark, and the public key is light. A certificate may be created using the public key of key pair 18 and a product type. The public key is signed by the ICM and installed on the IC. That initial phase of trust provisioning allows the OEM to verify the origin of received devices before continuing with their own trust provisioning. However, in this case, where the IC is a generic IC that can be configured one of multiple ways for different products, the product type may not be known at the time the IC is manufactured. Integrated circuit 16, in addition to other ICs, are shipped to the OEM in OEM environment 14 using a trusted channel 1. As shipped, the ICs do not have the certificates.

When the OEM finally communicates the product types the ICs are going to become, the ICM generates the plurality of key pairs 20, and using the plurality of key pairs 20 and the UIDs of the ICs, the ICM generates the certificates. As stated above, key pairs 20 are not related to the ICs that were shipped to the OEM but correspond to the different product types provided by the OEM. The certificates and the public key of each of the key pairs 20 are securely communicated to OEM environment 14 between computer 22 and computer 24 in OEM environment 14 via trusted link 2. In method 10, trusted link 2 is only used for communicating the certificates from the ICM to the OEM. The OEM verifies that the public key of the device has indeed been signed by the ICM using computer 24 via connection 3. Computer 24 is trusted by both the ICM and the OEM. However, because the OEM does not have access to the private keys assigned to product types, a required security level of computer system 24 can be lower than a security level of computer system 22. Once the signing of the public key by the ICM is verified, the OEM is assured that the device is genuine. That is, that the device comes from the genuine ICM, and the OEM proceeds with installing its own key material, code, and configuration data.

FIGS. 2-6 illustrate steps of method 10 of FIG. 1 in more detail.

Figure 2:
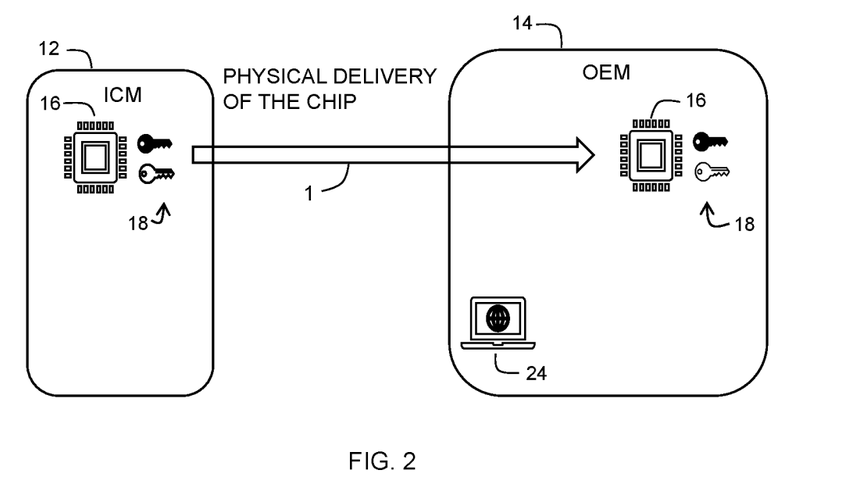
FIGS. 2-6 illustrate steps of the method of FIG. 1 in more detail.

FIG. 2 illustrates a portion of method 10 in more detail. The ICM manufactures a plurality of ICs and corresponding key pairs. Integrated circuit 16 and corresponding key pair 18 are representative of the plurality of ICs and key pairs. Key pair 18 is part of a unique identification (UID) for the IC and is the hardware root of trust. The ICM does not perform trust provisioning of the plurality of ICs. The manufacturing process of the ICs guarantees the uniqueness of the UIDs and keys. The ICM saves the UIDs and key pairs 18. The private key of key pair 18 will be later used to provide a genuineness mechanism to match the keys collected by the OEM and the ICs and to guarantee that trust provisioning keys can only be injected/used in genuine ICs from the ICM. The manufactured ICs 16 and corresponding key pairs 18 are delivered to the OEM via trusted channel 1.

Figure 3:
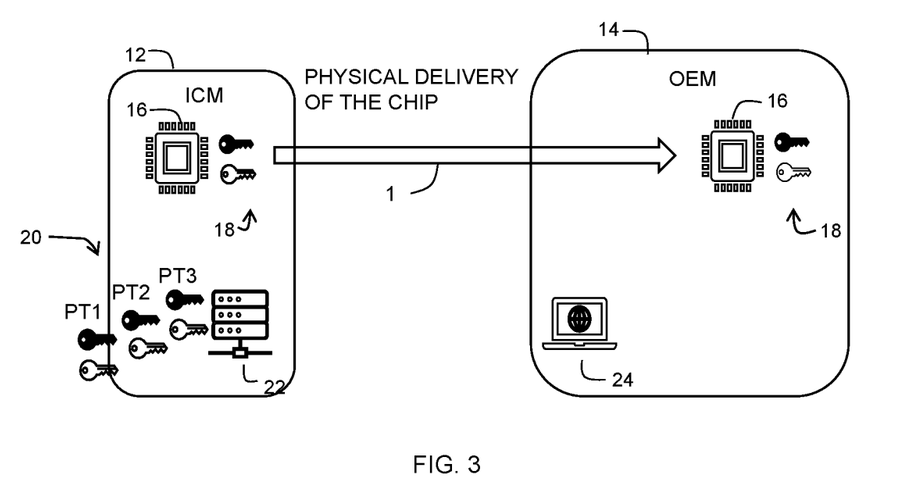

FIG. 3 illustrates another portion of method 10 of FIG. 1 in more detail. As illustrated in FIG. 3, the ICM creates a plurality of key pairs 20. In one embodiment, key pairs 20 may be used to sign certificate signing requests (CSRs) for products produced by the OEM when the product types are known. In another embodiment, a plurality of certificates may be produced without using CSRs. Key pairs 20 are not related to the ICs such as IC 16. Each key pair of key pairs 20 corresponds to one product type of products manufactured by the OEM, such as for example, product types labeled PT1, PT2 and PT3. Generally, the product type includes a vendor identification and a product identification. At the beginning of the process with the OEM, the ICM does not know in which product type the ICs manufactured by the ICM will be installed. Without the specific product types from the OEM, the only information the ICM possesses regarding product types may be a list of potential product types in which the ICs can be designed. For example, products such as surveillance cameras or door locks may have the same design but with differences, such as different features, different firmware, certifications, wiring, setup, and embodiments for interior and external devices (e.g., inside versus outside of a house or building). In some cases, the same ICs, or chips, may be used for all purposes but for different categories of products there may be different PTs. Other examples of internet of things (IoT) devices with potentially different product types may include light sensors, temperature sensors, and movement sensors.

Figure 4:
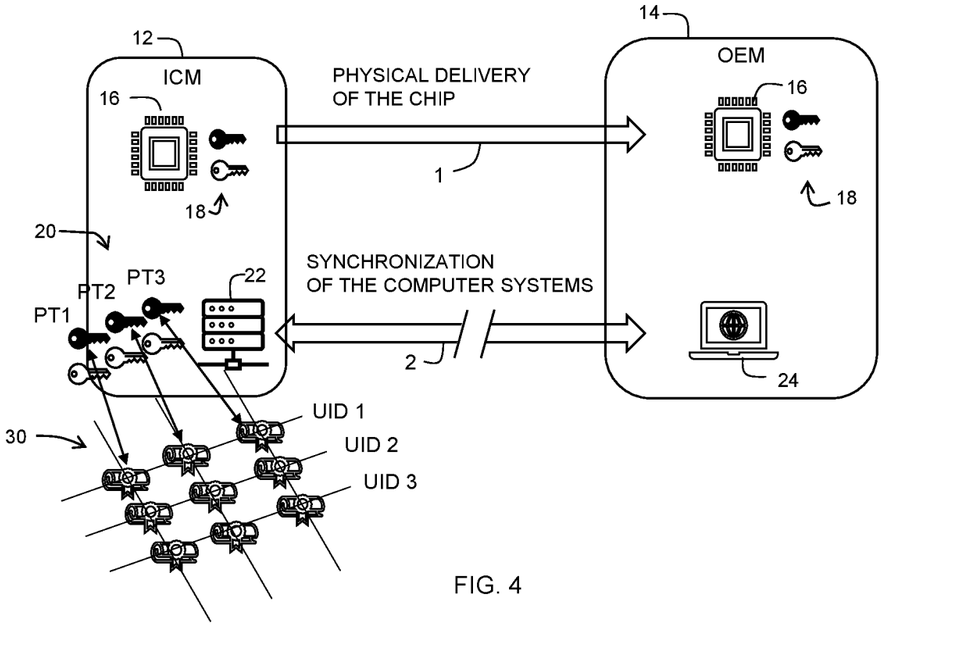

FIG. 4 illustrates another part of method 10 of FIG. 1 in more detail. By this point in the process, the ICM has saved the UIDs and the public keys of the key pairs 18 of the ICs it created and saved the plurality of key pairs 20 of the potential product types of the OEM. The ICM will assign the plurality of key pairs 20 to product types when the product types are known. The number of key pairs 20 will be equal to the number of product types. Using this information, the ICM pre-computes a plurality of certificates 30. Certificates 30 are organized as a matrix of product types to UIDs. FIG. 4 shows example product types PT 1-PT 3 and example UIDs UID 1-UID 3. This plurality of certificates and the public key for each certificate will be transferred to computer system 24 in OEM environment 14. Computer system 24 is used and trusted by both the ICM and the OEM. Computer system 24 can either be provided by the ICM or by the OEM depending in part on the ICM—OEM customer relationship. Computer systems 22 and 24 can be other hardware or equipment with the same or similar computing functionality as provided by computer systems 22 and 24. In one embodiment, computer system 24 may be provided by the OEM based on a specification provided the ICM. In another embodiment, computer system 24 may be delivered to OEM environment 14 by the ICM.

Figure 5:
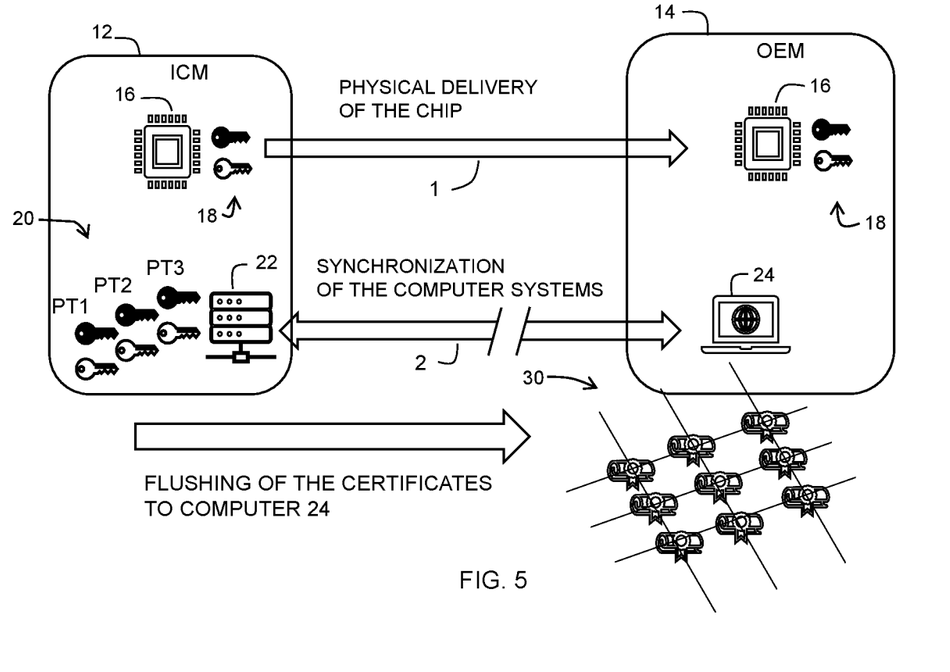

FIG. 5 illustrates another portion of method 10 of FIG. 1 in more detail. In FIG. 5, certificates 30 and the associated public keys of key pairs 20 are transferred to computer 24 in OEM environment 14. In one embodiment, the transfer can be performed at a distance through mutually authenticated network connections and trusted link 2. Trusted link 2 only needs to exist to transfer certificates 30 from computer 22 to computer 24. This is indicated in FIG. 5 by the broken arrow. The OEM will extract the certificates needed by the OEM for the product types being manufactured.

Figure 6:
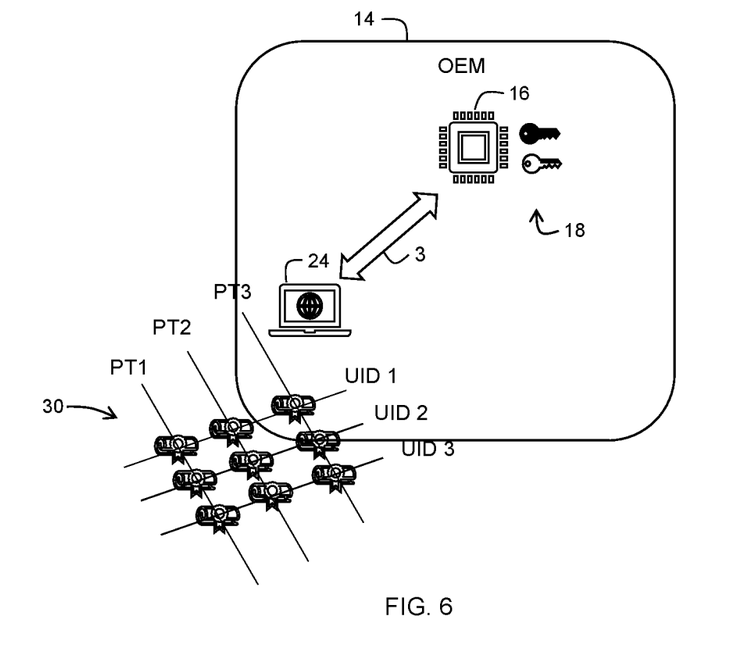

FIG. 6 illustrates another portion of method 10 of FIG. 1 in more detail. When the product types are known, a UID can be selected. A certificate corresponding to the selected UID and product type will be injected in the OEM products using computer system 24. The selection of the UID also includes verification of the genuineness of the IC and the specification of the product types. Before the certificate is injected, computer 24 may be used to verify the public key in the certificate and the public key in the IC match by using a challenge-response towards the IC. That is, prior to the OEM provisioning the OEM products with selected certificates, computer 24 compares a key pair corresponding to a selected certificate as generated by the ICM to a key pair corresponding to the selected certificate as possessed by the OEM. After the certificates required by the OEM are used, any remaining certificates may be erased. That is, a "zero balance" mechanism is put in place: either all the entries for the selected UID are erased, or all entries for the selected UID are made inaccessible. Whether to erase the remaining certificates may be decided by the OEM. For example, the decision to erase the remaining certificates may be determined based on a security risk and threat determination. Also, computer system 24 may be able to audit some or all the operations of the method and depending on agreement between the ICM and the OEM, the audit information may be uploaded to the ICM from time to time to support, for example, product payment and/or license fees based on product type.

Figure 7:
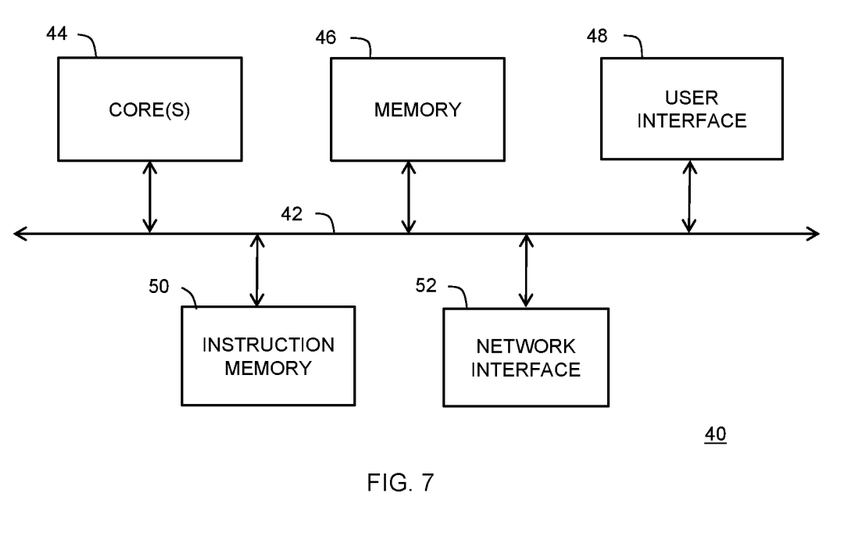
FIG. 7 illustrates a data processing system useful for implementing the method of FIG. 1.

FIG. 7 illustrates data processing system 40 useful for implementing method 10 in accordance with an embodiment. Data processing system 40 may be implemented on one or more integrated circuits. Data processing system 40 includes bus 42. In another embodiment, bus 42 may be a switch network. Connected to bus 42 is one or more processor core(s) 44, memory 46, user interface 48, instruction memory 50, and network interface 52. The one or more processor cores 44 may include any hardware device capable of executing instructions such as the provisioning software for use in method 10. The provisioning software may be stored in memory 46 and/or instruction memory 50. Processor cores 44 may be, for example, a microprocessor, field programmable gate array (FPGA), application-specific integrated circuit (ASIC), or similar device. Processor cores 104 may be implemented in a secure hardware element and may be tamper resistant.

Memory 46 may be any kind of memory, such as for example, L1, L2, or L3 cache or system memory. Memory 46 may include volatile memory such as static random-access memory (SRAM) or dynamic RAM (DRAM), or may include non-volatile memory such as flash memory, read only memory (ROM), or other volatile or non-volatile memory.

Also, memory 46 may be implemented in a secure hardware element and may be immutable. Alternately, memory 46 may be a hard drive implemented externally to data processing system 40. In one embodiment, memory 46 may be used to store assets for provisioning, random numbers, or other data.

User interface 48 may be connected to one or more devices for enabling communication with a user such as an administrator. For example, user interface 48 may be enabled for coupling to a display, a mouse, a keyboard, or other input/output device. Network interface 52 may include one or more devices for enabling communication with other hardware devices. For example, network interface 52 may include, or be coupled to, a network interface card (NIC) configured to communicate according to the Ethernet protocol. Also, network interface 52 may implement a TCP/IP stack for communication according to the TCP/IP protocols. Data samples for classification may be input via network interface 112, or similar interface. Various other hardware or configurations for communicating are available.

Instruction memory 50 may include one or more non-transient machine-readable storage media for storing instructions for execution by processor cores 44. In other embodiments, both memories 46 and 50 may store data upon which processor cores 44 may operate. Memories 46 and 50 may also store, for example, encryption, decryption, and verification applications. Memories 46 and 50 may be implemented in a secure hardware element and may be tamper resistant.

The herein described method provides a secure approach to provision a plurality of generic ICs for use in multiple product types. The method allows delivery of the ICs to the OEM when knowledge of the product types is delayed. The method facilitates product handling by the OEM for provisioning on the OEM's premises and reduces or eliminates a need for a direct connection to a hardware security module (HSM). Also, the method provides for more efficient use of memory by deleting any unused certificates.

The method is flexible and may be adapted for different needs of OEMs such as internet of things (IoT) device manufacturers or automotive manufacturers. Multiple data types encrypted with different keys can be easily supported. Also, different types of keys and algorithms can be used, or the method may be adapted to different strategies for updating keys. Example encryption algorithms that may be used is RSA (Rivest Shamir Adleman) and elliptic curve digital signature algorithm (ECDSA).

Various embodiments, or portions of the embodiments, may be implemented in hardware or as instructions on a non-transitory machine-readable storage medium including any mechanism for storing information in a form readable by a machine, such as a personal computer, laptop computer, file server, smart phone, or other computing device. The non-transitory machine-readable storage medium may include volatile and non-volatile memories such as read only memory (ROM), random access memory (RAM), magnetic disk storage media, optical storage medium, flash memory, and the like. The non-transitory machine-readable storage medium excludes transitory signals.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

The invention claimed is:

1. A method for provisioning a plurality of integrated circuits (ICs), the method comprising:
providing, by a first entity to a second entity, the plurality of ICs for use in a plurality of manufactured products, wherein each IC of the plurality of ICs includes a key pair and a unique identifier (UID);
generating, by the first entity, a plurality of key pairs, wherein the plurality of key pairs is not related to the plurality of ICs;
receiving, by the first entity, a plurality of product types from the second entity;
generating, by the first entity, a plurality of certificates using the plurality of UIDs and the plurality of key pairs, and wherein portions of the plurality of key pairs are associated with the plurality of product types; and
transmitting the plurality of certificates from a first computer system of the first entity to a second computer system, the second computer system under physical control of the second entity, wherein the second entity is enabled by the first entity to access the plurality of certificates in the second computer system and to inject at least a portion of the plurality of ICs with selected certificates of the plurality of certificates.

2. The method of claim 1, wherein receiving a plurality of product types from the second entity further comprises receiving a certificate signing request (CSR) corresponding to a product type of the plurality of product types, and wherein the first entity uses a key pair of the plurality of key pairs associated with a certificate to sign the CSR.

3. The method of claim 1, further comprising, prior to the second entity injecting at least a portion of the plurality of manufactured products with the selected certificates, the second computer system favorably comparing a key pair corresponding to a selected certificate as generated by the first entity to a key pair corresponding to the selected certificate as possessed by the second entity.

4. The method of claim 1, wherein all the plurality of certificates for all the plurality of product types are pre-computed by the first entity and transmitted to the second computer system from the first computer system in response to receiving the plurality of product types from the second entity.

5. The method of claim 1, wherein a key pair of the plurality of key pairs comprises a private key and a public key, wherein a public key is transmitted with each certificate of the plurality of certificates transmitted to the second entity.

6. The method of claim 1, wherein the product type comprises a vendor identification and a product identification.

7. The method of claim 1, wherein the second computer system under physical control of the second entity is trusted by the first entity.

8. The method of claim 1, wherein the first entity is a manufacturer of the plurality of ICs, and the second entity is a trusted manufacturer of the plurality of manufactured products.

9. The method of claim 1, further comprising deleting unused certificates of the plurality of certificates from the second computer system.

10. The method of claim 1, wherein an asymmetric cryptographic mechanism is used to create the plurality of certificates.

11. A method for provisioning a plurality of integrated circuits (ICs), the method comprising:
providing, by a first entity to a second entity, the plurality of ICs being of a same type and for use in a plurality of manufactured products, wherein each IC of the plurality of ICs includes one key pair of a plurality of first key pairs and a unique identifier (UID) of a plurality of UIDs;
generating, by the first entity, a plurality of second key pairs, wherein the plurality of second key pairs is not related to the plurality of ICs;
receiving, by the first entity, a plurality of product types from the second entity;
generating, by the first entity, a plurality of certificates using the plurality of UIDs and the plurality of product types;
transmitting the plurality of certificates from a first computer system of the first entity to a second computer system, the second computer system under physical control of the second entity, wherein the second entity is enabled by the first entity to access the plurality of certificates in the second computer system and to provision at least a portion of the plurality of ICs with selected certificates of the plurality of certificates; and
deleting unused certificates of the plurality of certificates from the second computer system.

12. The method of claim 11, further comprising, prior to the second entity provisioning at least a portion of the plurality of manufactured products with the selected certificates, the second computer system favorably comparing a key pair corresponding to a selected certificate as generated by the first entity to a key pair corresponding to the selected certificate as possessed by the second entity.

13. The method of claim 11, wherein all the plurality of certificates for all the plurality of product types are pre-computed by the first entity and transmitted to the second computer from the first computer system in response to receiving the plurality of product types from the second entity.

14. The method of claim 11, wherein a key pair of the plurality of key pairs comprises a private key and a public key, wherein a public key is transmitted with each certificate of the plurality of certificates transmitted to the second entity.

15. The method of claim 11, wherein the product type comprises a vendor identification and a product identification.

16. The method of claim 11, wherein the second computer system under physical control of the second entity is trusted by the first entity.

17. The method of claim 11, wherein the first entity is a manufacturer of the plurality of ICs, and the second entity is a trusted manufacturer of the plurality of manufactured products.

18. The method of claim 11, wherein the plurality of ICs is all the same generic IC type that is intended to be used in the plurality of product types.

19. The method of claim 11, wherein an asymmetric cryptographic mechanism is used to create the plurality of certificates.

20. The method of claim 11, wherein the second computer system assesses a genuineness of each IC of the plurality of ICs prior to the provision of the at least a portion of the plurality of ICs.

21. The method of claim 11, further comprising receiving a certificate signing request (CSR) corresponding to a product type of the plurality of product types, wherein the first entity uses a key pair of the plurality of second key pairs associated with the certificate to sign the CSR.

* * * * *